(12) United States Patent
Nakamura et al.

(10) Patent No.: US 11,604,537 B2
(45) Date of Patent: Mar. 14, 2023

(54) DISPLAY DEVICE WITH TOUCH PANEL AND METHOD FOR CONTROLLING DISPLAY DEVICE WITH TOUCH PANEL

(71) Applicant: Sharp Display Technology Corporation, Mie (JP)

(72) Inventors: Yousuke Nakamura, Kameyama (JP); Daiji Kitagawa, Kameyama (JP); Jin Miyazawa, Kameyama (JP); Daisuke Suehiro, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/690,075

(22) Filed: Mar. 9, 2022

(65) Prior Publication Data
US 2022/0291802 A1    Sep. 15, 2022

(30) Foreign Application Priority Data
Mar. 10, 2021   (JP) ............................. JP2021-038277

(51) Int. Cl.
G09G 3/36 (2006.01)
G06F 3/041 (2006.01)
G06F 3/044 (2006.01)

(52) U.S. Cl.
CPC ........ *G06F 3/04166* (2019.05); *G06F 3/0441* (2019.05); *G06F 3/0442* (2019.05); *G09G 3/36* (2013.01); *G09G 2310/08* (2013.01); *G09G 2340/0435* (2013.01)

(58) Field of Classification Search
CPC .. G06F 3/0445; G06F 3/0446; G06F 3/04184; G06F 3/0412; G06F 3/0443; G09G 3/36
See application file for complete search history.

(56) References Cited

U.S. PATENT DOCUMENTS

| | | | |
|---|---|---|---|
| 9,310,911 B2 * | 4/2016 | Sugita | G09G 3/3648 |
| 10,055,036 B2 * | 8/2018 | Koike | G06F 3/0442 |
| 10,365,755 B2 * | 7/2019 | Uchiyama | G06F 3/04184 |
| 11,357,049 B2 * | 6/2022 | Sugaya | H04W 74/0816 |
| 2012/0013555 A1 * | 1/2012 | Maeda | G06F 3/0446 345/173 |
| 2013/0176251 A1 * | 7/2013 | Wyatt | G06F 3/04166 345/173 |
| 2016/0092010 A1 * | 3/2016 | Agarwal | G06F 3/0412 345/173 |
| 2017/0205943 A1 * | 7/2017 | Uchiyama | G06F 3/0445 |
| 2018/0024654 A1 * | 1/2018 | Koike | G09G 3/20 345/174 |
| 2021/0037570 A1 * | 2/2021 | Sugaya | H04L 69/22 |

FOREIGN PATENT DOCUMENTS

| | | |
|---|---|---|
| JP | 2017-130040 A | 7/2017 |
| JP | 6659622 B2 | 3/2020 |

* cited by examiner

*Primary Examiner* — Olga V Merkoulova
(74) *Attorney, Agent, or Firm* — Keating & Bennett, LLP (57) ABSTRACT

A display device includes a touch panel, a panel control unit, and a storage unit configured to store an image signal. The panel control unit provides control to perform a touch detection operation and a write operation in an alternating manner in an image input period and to perform at least the touch detection operation at regular intervals in a suspension period. When an image input period starts, the panel control unit provides control to perform the write operation after an ongoing or subsequent touch detection operation finishes.

6 Claims, 7 Drawing Sheets

| | FINGER TOUCH MODE | | | PEN TOUCH MODE |
|---|---|---|---|---|
| T1 | WRITE OPERATION<br>— | | T1 | WRITE OPERATION<br>BEACON-SIGNAL TRANSMIT OPERATION |
| T2 | WRITE OPERATION<br>FINGER-TOUCH DETECTION OPERATION | | T2 | WRITE OPERATION<br>FINGER-TOUCH DETECTION OPERATION |
| T3 | WRITE OPERATION<br>FINGER-TOUCH DETECTION OPERATION | | T3 | WRITE OPERATION<br>FINGER-TOUCH DETECTION OPERATION |
| T4 | WRITE OPERATION<br>FINGER-TOUCH DETECTION OPERATION | | T4 | WRITE OPERATION<br>COORDINATE-DETECTION-SIGNAL RECEIVE OPERATION |
| T5 | WRITE OPERATION<br>FINGER-TOUCH DETECTION OPERATION | | T5 | WRITE OPERATION<br>TILT-AND-PRESSURE-SIGNAL RECEIVE OPERATION |
| T6 | WRITE OPERATION<br>— | | T6 | WRITE OPERATION<br>TILT-AND-PRESSURE-SIGNAL RECEIVE OPERATION |
| T7 | WRITE OPERATION<br>— | | T7 | WRITE OPERATION<br>COORDINATE-DETECTION-SIGNAL RECEIVE OPERATION |
| T8 | WRITE OPERATION<br>FINGER-TOUCH DETECTION OPERATION | | T8 | WRITE OPERATION<br>FINGER-TOUCH DETECTION OPERATION |
| T9 | WRITE OPERATION<br>FINGER-TOUCH DETECTION OPERATION | | T9 | WRITE OPERATION<br>FINGER-TOUCH DETECTION OPERATION |
| T10 | WRITE OPERATION<br>FINGER-TOUCH DETECTION OPERATION | | T10 | WRITE OPERATION<br>COORDINATE-DETECTION-SIGNAL RECEIVE OPERATION |
| T11 | WRITE OPERATION<br>FINGER-TOUCH DETECTION OPERATION | | T11 | WRITE OPERATION<br>TILT-AND-PRESSURE-SIGNAL RECEIVE OPERATION |
| T12 | WRITE OPERATION<br>— | | T12 | WRITE OPERATION<br>TILT-AND-PRESSURE-SIGNAL RECEIVE OPERATION |
| T13 | WRITE OPERATION<br>— | | T13 | WRITE OPERATION<br>COORDINATE-DETECTION-SIGNAL RECEIVE OPERATION |

DISPLAY DEVICE WITH TOUCH PANEL AND METHOD FOR CONTROLLING DISPLAY DEVICE WITH TOUCH PANEL

BACKGROUND

1. Field

The present disclosure relates to a display device with a touch panel and a method for controlling a display device with a touch panel.

2. Description of the Related Art

A known display device with a touch panel has an image display function and a touch detection function. A method for controlling such a display device with a touch panel is also known. Japanese Unexamined Patent Application Publication No. 2017-130040 (Patent literature 1) discloses an example of the display device with a touch panel and the method for controlling such a display device with a touch panel.

The display device with a touch panel described in Patent literature 1 performs in a time-sharing manner a display operation for refreshing the displayed content in accordance with picture information of one frame and a touch detection operation for detecting a touch with a finger on the touch panel. In this display device, the touch detection period in which the detection of one entire detection surface is completed is set to be longer than the frame display period for which the display operation is performed.

Incidentally, another known display device provides control by using a variable frame rate in which the length of period per frame is changeable.

It is desirable that the display device configured to provide control by using a variable frame rate also have a function of detecting a touch with, for example, a finger or pen.

The present disclosure has been made to achieve the desired goal described above. The present disclosure provides a display device with a touch panel that can detect a touch with, for example, a finger or pen while providing control by using a variable frame rate. The present disclosure also provides a method for controlling such a display device with a touch panel.

SUMMARY

A display device with a touch panel according to a first aspect of the present disclosure is configured to operate by using a variable frame rate. The variable frame rate is configured by changing, of an image input period and a suspension period that constitute one frame, the length of the suspension period. In the image input period, an image signal is supplied to the display device with a touch panel, and in the suspension period, no image signal is supplied to the display device with a touch panel. The display device with a touch panel includes a touch panel including a pixel electrode, a control unit configured to control displaying of the touch panel and touch detection of the touch panel, and a storage unit configured to store the image signal. The control unit includes a touch detection control unit configured to perform a touch detection operation of the touch panel in the image input period and the suspension period, a display control unit configured to perform a write operation of outputting the image signal stored in the storage unit to the touch panel and loading the pixel electrode with a data signal based on the image signal in the image input period, and a timing control unit configured to provide control to perform the touch detection operation and the write operation in an alternating manner in the image input period and to perform at least the touch detection operation at regular intervals in the suspension period. The timing control unit is further configured to, when a new period of the image input period starts, provide control to perform the write operation after an ongoing or subsequent sub-operation of the touch detection operation finishes.

A method according to a second aspect is for controlling a display device with a touch panel including a pixel electrode and being configured to operate by using a variable frame rate. The variable frame rate is configured by changing, of an image input period and a suspension period that constitute one frame, the length of the suspension period. In the image input period, an image signal is supplied to the display device with a touch panel, and in the suspension period, no image signal is supplied to the display device with a touch panel. The method includes storing the image signal in a storage unit, providing control to perform in an alternating manner a touch detection operation of the touch panel and a write operation of outputting the image signal stored in the storage unit to the touch panel and loading the pixel electrode with a data signal based on the image signal in the image input period, providing control to perform at least the touch detection operation at regular intervals in the suspension period, and when a new period of the image input period starts, providing control to perform the write operation after an ongoing or subsequent sub-operation of the touch detection operation finishes.

DESCRIPTION OF THE EMBODIMENTS

Hereinafter, an embodiment of the present disclosure will be described in detail with reference to the drawings. Identical or corresponding portions in the drawings are assigned identical reference characters, and descriptions thereof are not repeated. For ease of description, in the drawings referred to in the following description, configurations may be simplified or illustrated in a schematic manner, or some constituent elements may be omitted. The constituent elements in the drawings are not necessarily illustrated in proportion to the actual measurements.

Configuration of Display Device with Touch Panel

Figure 1:
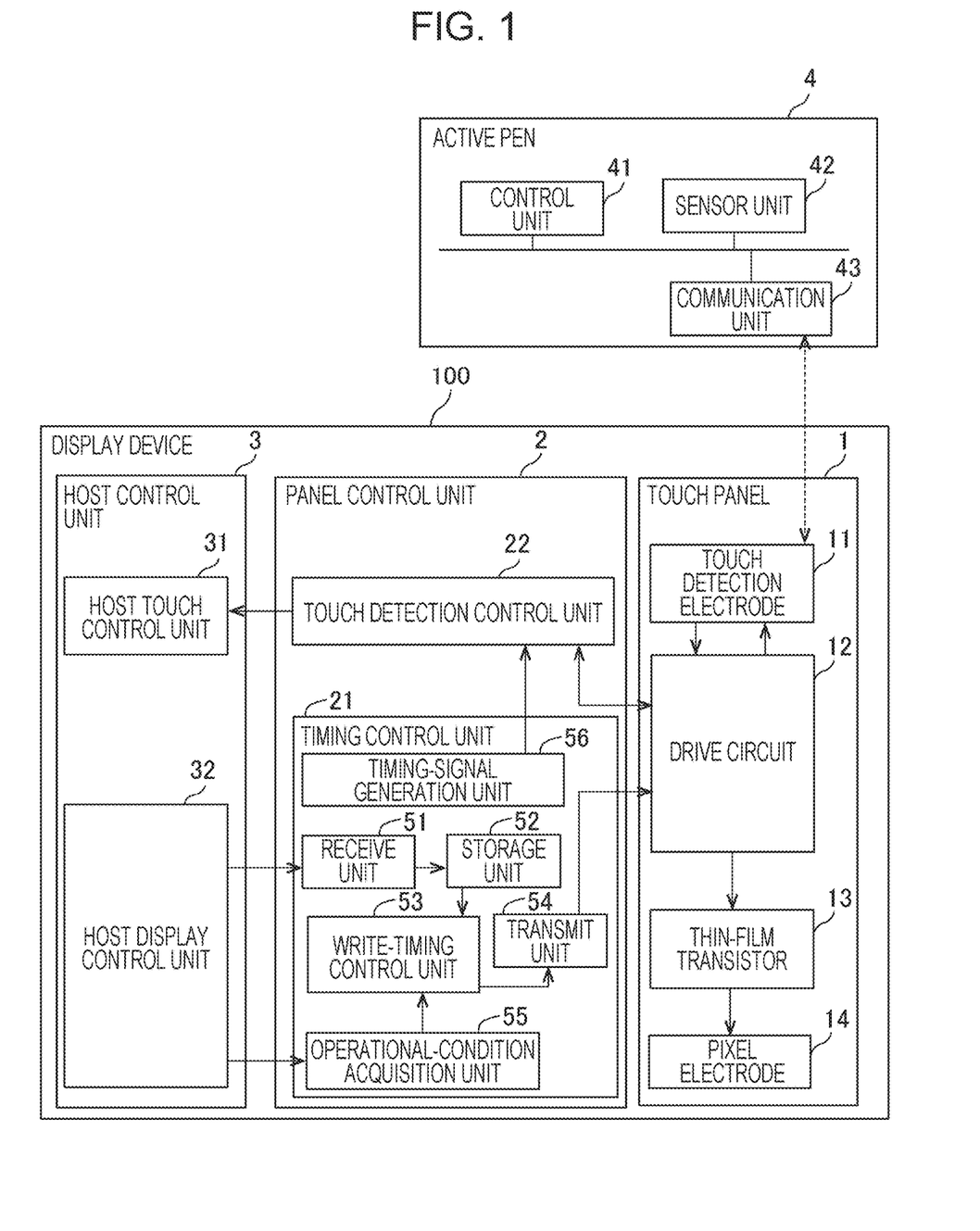
FIG. 1 is a block diagram illustrating a functional configuration of a display device according to an embodiment.

FIG. 1 illustrates a configuration of a display device 100 with a touch panel (hereinafter referred to as "display device 100") according to the present embodiment. FIG. 1 is a block diagram illustrating a functional configuration of the display device 100 according to the present embodiment.

As illustrated in FIG. 1, the display device 100 includes a touch panel 1, a panel control unit 2, and a host control unit 3. The touch panel 1 has a touch detection function of detecting a touch with a pointer such as a finger or an active pen 4 and locating the touched position. The touch panel 1 also has a display function of displaying an image or picture. The touch panel 1 may be formed as, for example, an in-cell touch panel having a liquid crystal layer. The panel control unit 2 provides control for touch detection on the touch panel 1 and control for displaying on the touch panel 1. The host control unit 3 provides control of the entire display device 100. The active pen 4 (stylus) held by a user communicates a touch input by the user to the touch panel 1.

As illustrated in FIG. 1, the touch panel 1 includes a plurality of touch detection electrodes 11, a drive circuit 12, a thin-film transistor 13, and a plurality of pixel electrodes 14. For ease of description, FIG. 1 illustrates one touch detection electrode 11 and one pixel electrode 14. The drive circuit 12 includes, for example, one or more integrated circuits.

Figure 2:
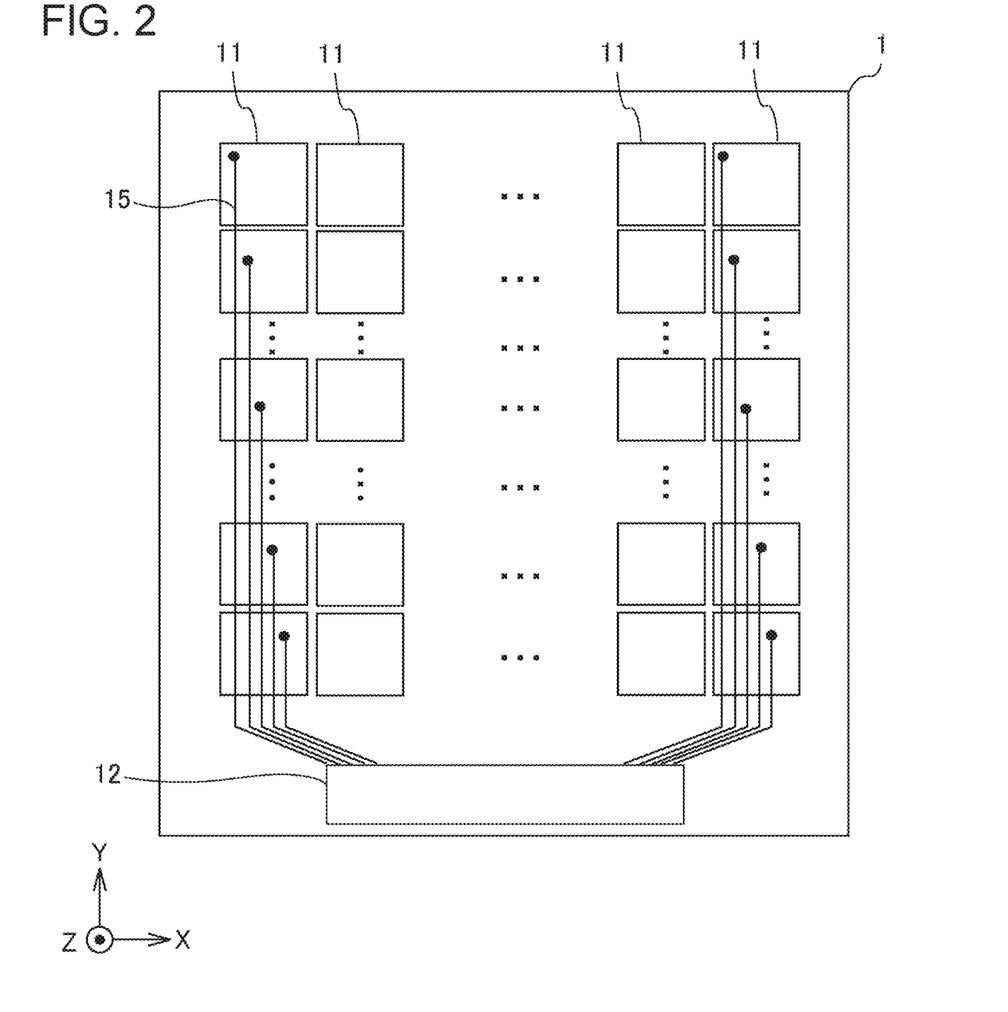
FIG. 2 is a plan view schematically illustrating an arrangement of touch detection electrodes in a touch panel.

FIG. 2 is a plan view schematically illustrating a structure of the touch panel 1. As illustrated in FIG. 2, the plurality of touch detection electrodes 11 are arranged in, for example, a matrix. The drive circuit 12 includes a touch detection driver. Touch signal lines 15 connect the plurality of touch detection electrodes 11 to the drive circuit 12 (touch detection driver).

Figure 3:
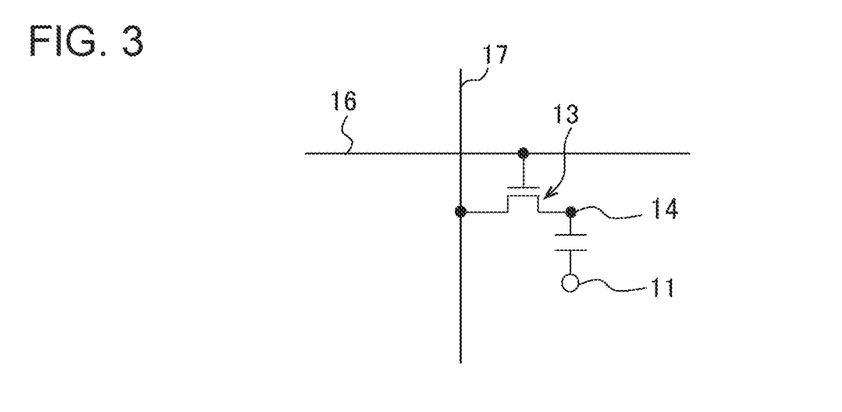
FIG. 3 is a circuit diagram illustrating a connection of a thin-film transistor in the touch panel.

FIG. 3 is a circuit diagram illustrating a connection of the thin-film transistor 13 and the pixel electrode 14. The drive circuit 12 (refer to FIG. 1) further includes a gate driver and a source driver. The gate driver of the drive circuit 12 is coupled to a gate line 16. The source driver of the drive circuit 12 is coupled to a source line 17. A gate electrode of the thin-film transistor 13 is coupled to the gate line 16. A source electrode of the thin-film transistor 13 is coupled to the source line 17. A drain electrode of the thin-film transistor 13 is coupled to the pixel electrode 14. Electrostatic capacity is caused between the pixel electrode 14 and the touch detection electrode 11. The touch detection electrode 11 is shared by multiple pixel electrodes 14, and the touch detection electrode 11 functions as a common electrode.

The gate driver of the drive circuit 12 successively supplies gate signals (scanning signals) to a plurality of gate lines 16. The source driver of the drive circuit 12 supplies source signals based on image signals to a plurality of source lines 17. The gate signals are supplied to the thin-film transistor 13, the thin-film transistor 13 is activated, and the pixel electrodes 14 are accordingly loaded with the source signals. Electric fields caused between the pixel electrodes 14 and the touch detection electrodes 11 (common electrodes) activate the liquid crystal layer, which is not illustrated in the drawings, and as a result, an image is displayed on the touch panel 1.

The host control unit 3 includes a host touch control unit 31 and a host display control unit 32 as illustrated in FIG. 1. The host touch control unit 31 and the host display control unit 32 each include a processor for providing control. The host touch control unit 31 communicates with the panel control unit 2 to receive information about touch detection from the panel control unit 2. The "information about touch detection" includes, for example, information of the position touched by a finger or the active pen 4, information of the tilt of the active pen 4, and information of the strength (pressure) of stroke of the active pen 4. The host display control unit 32 supplies (transmits) to the panel control unit 2 a broadcast signal or an image signal obtained from a storage medium not illustrated in the drawings.

Figure 4:
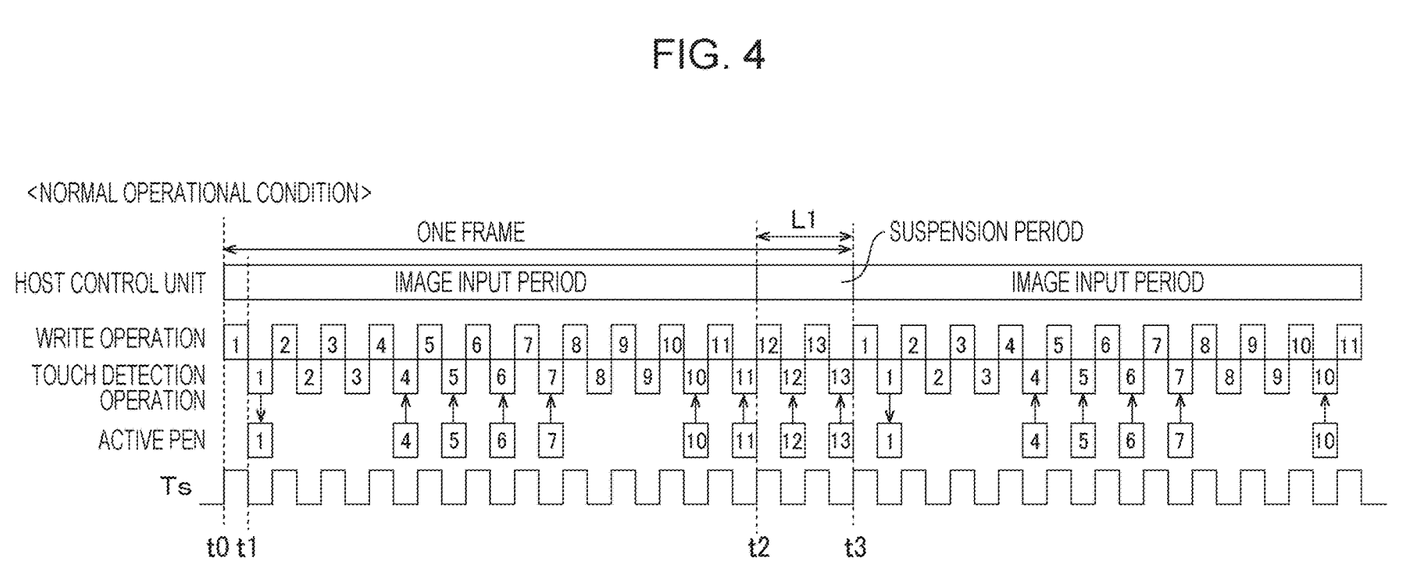
FIG. 4 is a timing diagram illustrating a touch detection operation and a write operation in a normal operational condition.
Figure 5:
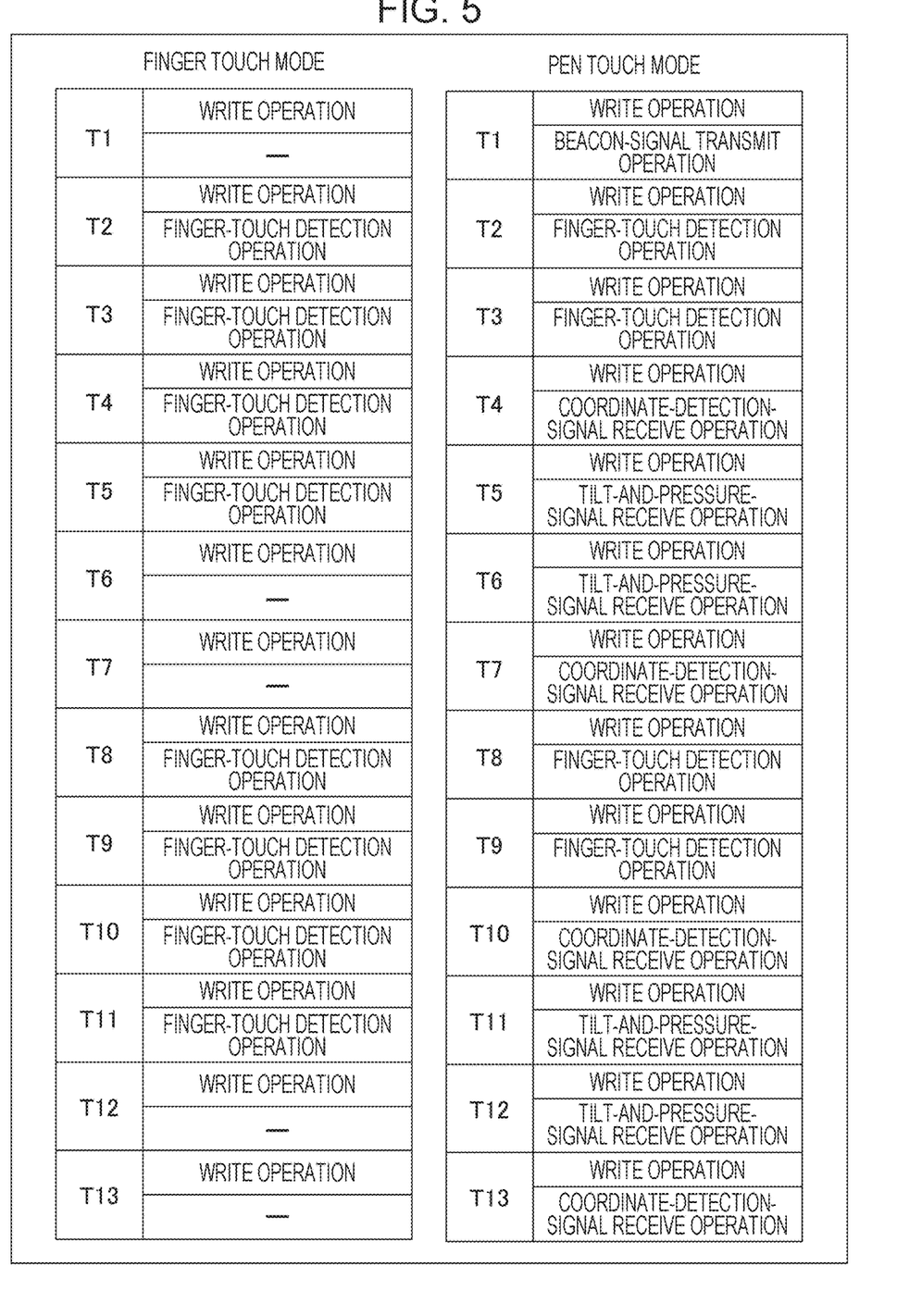
FIG. 5 illustrates a finger touch mode and a pen touch mode.
Figure 6:
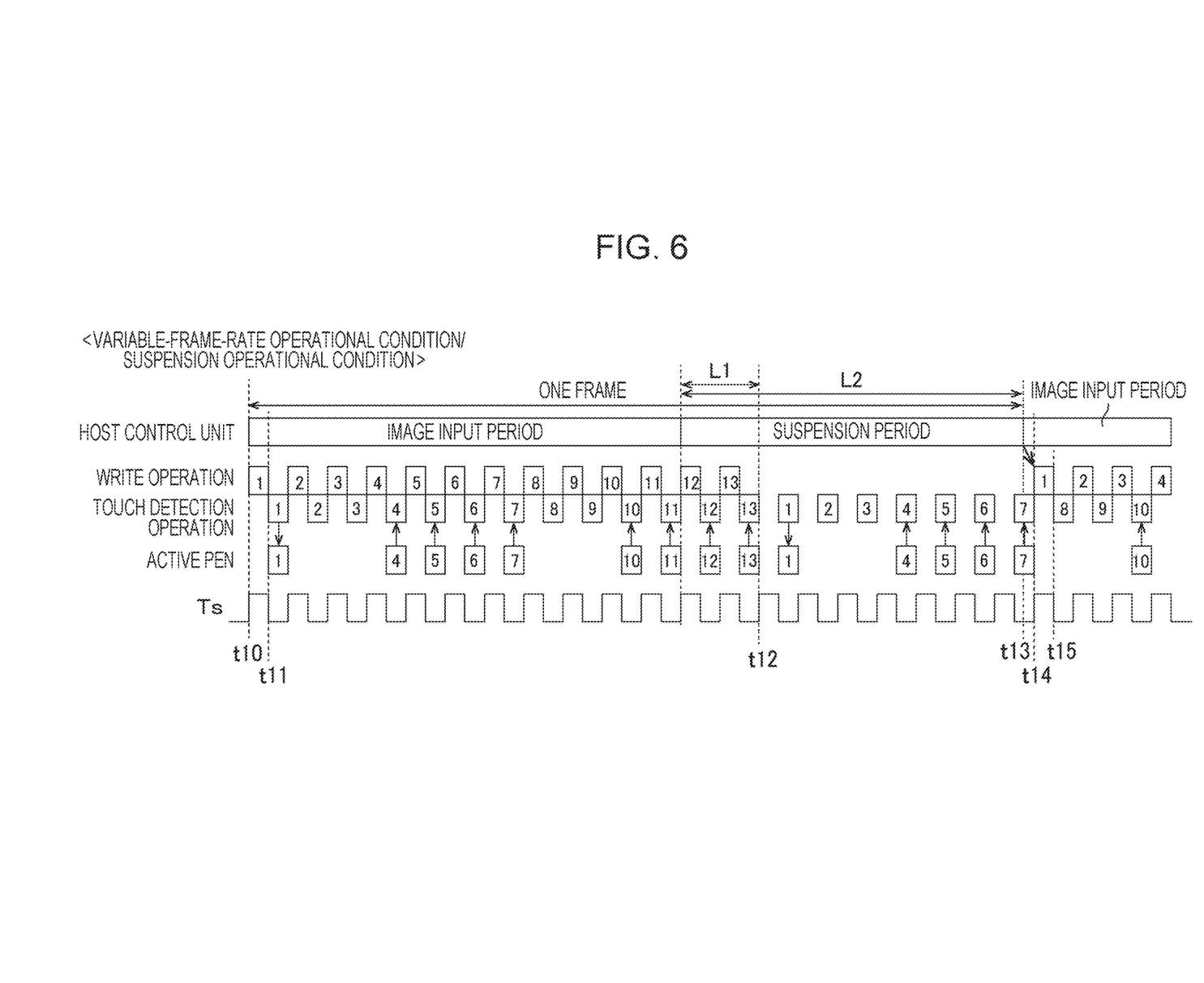
FIG. 6 is a timing diagram illustrating the touch detection operation and the write operation in a variable-frame-rate operational condition and a suspension operational condition.

The display device 100 is a display device configured to operate in accordance with a variable frame rate. The "variable frame rate" is configured by changing, of an image input period and a suspension period that constitute one frame, the length of the suspension period. The "image input period" denotes a period in which image signals are supplied from the host control unit 3 to the panel control unit 2. The "suspension period" denotes a period in which no image signal is supplied from the host control unit 3 to the panel control unit 2. The host display control unit 32 (operational-condition determination unit) selects, in accordance with the setting operation by the user and the image content, one operational condition from a normal operational condition, a suspension operational condition, and a variable-frame-rate operational condition. In the normal operational condition (refer to FIG. 4), one frame includes a suspension period of a first predetermined length L1; in the suspension operational condition (refer to FIG. 6), one frame includes a suspension period of a second predetermined length L2 longer than the length L1; in the variable-frame-rate operational condition, one frame includes a suspension period of variable length. FIG. 4 illustrates an example of an operation of the display device 100 in the normal operational condition. FIG. 5 illustrates details of a write operation and a touch detection operation. FIG. 6 illustrates an example of an operation of the display device 100 in the suspension operational condition. It is noted that the length of the suspension period in the variable-frame-rate operational condition is L2 in FIG. 6, but the length of the suspension period changes for each frame. The host display control unit 32 sends information about the selected operational condition to the panel control unit 2.

As illustrated in FIG. 1, the active pen 4 is a pointer detected by the touch panel 1 with its touch input and a pen having a function of communicating with the panel control unit 2. The active pen 4 includes a control unit 41, a sensor unit 42, and a communication unit 43. The communication unit 43 includes a communication interface for transmitting and receiving (communicating) signals through the touch detection electrodes 11 of the touch panel 1 to and from the panel control unit 2. The sensor unit 42 includes a sensor for sensing the pressure (strength of stroke) of the active pen 4 on the touch panel 1 and a sensor for sensing the tilt of the active pen 4. The control unit 41 includes a processor for providing control of the active pen 4 with regard to communication.

The control unit 41 receives a beacon signal B transmitted by the touch panel 1 through the communication unit 43 at a predetermined timing (period "1" in FIG. 4). In response to the beacon signal B, the control unit 41 transmits a coordinate detection signal P at predetermined timings (periods "4", "7", "10", and "13" in FIG. 4) and a tilt and pressure signal D at predetermined timings (periods "5", "6", "11", and "12" in FIG. 4) to the touch panel 1 (touch detection electrodes 11). The beacon signal B may include identification information uniquely assigned to the touch panel 1. In this case, the control unit 41 recognizes the touch panel 1 in accordance with the received identification information and transmits the coordinate detection signal P and the tilt and pressure signal D at predetermined timings corresponding to the recognized touch panel 1. The panel control unit 2 locates the position of the touch detection electrode 11 receiving the coordinate detection signal P, so that the panel control unit 2 locates the position at which a touch by the active pen 4 is detected. The panel control unit 2 also obtains information about the tilt of the active pen 4 and information about the pressure (strength of stroke) of the active pen 4 in accordance with the tilt and pressure signal D.

Configuration of Panel Control Unit

As illustrated in FIG. 1, the panel control unit 2 includes a timing control unit 21 and a touch detection control unit 22. The timing control unit 21 includes a processor for providing control about timings of the write operation in the touch panel 1 and timings of the touch detection operation in the touch panel 1. The timing control unit 21 includes a receive unit 51, a storage unit 52, a write-timing control unit 53, a transmit unit 54, an operational-condition acquisition unit 55, and a timing-signal generation unit 56. In the "write operation", an image signal stored in the storage unit 52 is transmitted to the touch panel 1, a source signal (data signal) based on the image signal is supplied to the thin-film transistor 13, and the pixel electrode 14 is accordingly loaded. As illustrated in FIG. 5, the "touch detection operation" includes a "finger-touch detection operation", a "beacon-signal transmit operation", a "coordinate-detection-signal receive operation", and a "tilt-and-pressure-signal receive operation". In the "finger-touch detection operation", the electrostatic capacity between the touch detection electrode 11 and the pixel electrode 14 is detected when the electrostatic capacity is changed by a pointer such as a finger in contact with or close to the touch panel 1. In the "beacon-signal transmit operation", the panel control unit 2 transmits the beacon signal B to the active pen 4. In the "coordinate-detection-signal receive operation", the panel control unit 2 receives the coordinate detection signal P transmitted by the active pen 4 via the touch panel 1. In the "tilt-and-pressure-signal receive operation", the panel control unit 2 receives the tilt and pressure signal D transmitted by the active pen 4 via the touch panel 1.

As illustrated in FIGS. 4 and 5, in the present embodiment, the timing control unit 21 performs the "write operation" in thirteen sub-operations and the "touch detection operation" in thirteen sub-operations for one frame in the normal operational condition. This means that the timing control unit 21 sets thirteen periods to perform the write operation by using an image signal acquired from the host control unit 3 in the image input period.

As illustrated in FIG. 1, the receive unit 51 includes a communication interface for receiving an image signal from the host control unit 3. The storage unit 52 includes a frame buffer for storing the image signal received by the receive unit 51. The write-timing control unit 53 (display control unit) includes a processor for determining a timing to perform the write operation. The transmit unit 54 (display control unit) supplies an image signal stored in the storage unit 52 to the drive circuit 12 of the touch panel 1 in response to an instruction provided by the write-timing control unit 53. The operational-condition acquisition unit 55 acquires information about operational condition from the host control unit 3. The timing-signal generation unit 56 generates a timing signal (TSYNC; hereinafter referred to as "Ts") and supplies the timing signal Ts to the touch detection control unit 22. Accordingly, as illustrated in FIG. 4, the write-timing control unit 53 performs the write operation on the touch panel 1 at regular intervals in synchronization with the timing signal Ts.

The touch detection control unit 22 includes a processor for performing the touch detection operation by the touch panel 1. Although the timing control unit 21 and the touch detection control unit 22 are individually illustrated in FIG. 1, the timing control unit 21 and the touch detection control unit 22 are not necessarily implemented by individual hardware components. This means that a single hardware component may implement both the function of the timing control unit 21 and the function of the touch detection control unit 22. As illustrated in FIG. 4, the touch detection control unit 22 receives the timing signal Ts from the timing control unit 21 and performs the touch detection operation at regular intervals in synchronization with the timing signal Ts.

As illustrated in FIG. 5, the touch detection control unit 22 switches between a finger touch mode and a pen touch mode in accordance with the instruction provided by the host touch control unit 31. In the finger touch mode, touch detection is performed for a touch by a pointer such as a finger without communicating with the active pen 4. In the pen touch mode, touch detection is performed for a touch by a pointer such as a finger and also for a touch by the active pen 4 while communicating with the active pen 4. FIG. 5 illustrates details of an operation in the finger touch mode and details of an operation in the pen touch mode for one frame in the normal operational condition. Here, "periods T1 to T13" in FIG. 5 respectively correspond to "1 to 13" in FIG. 4.

Operation in Finger Touch Mode

As illustrated in FIG. 5, the "finger-touch detection operation" is performed in the period T2. Specifically, drive signals are supplied to some (for example, half) of the plurality of touch detection electrodes 11 of the touch panel 1; detection signals are received from the touch detection electrodes 11 provided with the drive signals; and touch detection is performed for a touch by a pointer such as a finger in accordance with the detection signals. Subsequently, in the period T3, drive signals are supplied to others (for example, rest half) of the plurality of touch detection electrodes 11 of the touch panel 1; detection signals are received from the touch detection electrodes 11 provided with the drive signals; and touch detection is performed for a touch by a pointer such as a finger in accordance with the detection signals. This means that in the periods T2 and T3 touch detection is performed for all the touch detection electrodes 11 of the touch panel 1. After the period T3 ends, the touch detection control unit 22 transmits a touch detection report to the host control unit 3. The touch detection operation is performed and the touch detection report is transmitted for the periods T4 and T5, T8 and T9, and T10 and T11 in the same manner as the periods T2 and T3. When the frame rate is 60 Hz, the touch detection report is transmitted at 240 Hz. The write operation instead of the touch detection operation is performed in the periods T1, T6, T7, T12, and T13. As such, the finger touch mode matches the pen touch mode with respect to the number of periods (the number of operations). The write operation is performed also in the periods T2 to T5 and T8 to T11.

Operation in Pen Touch Mode

In the period T1, the touch detection control unit 22 transmits the beacon signal B to the active pen 4. In the periods T4, T7, T10, and T13, the active pen 4 transmits the coordinate detection signal P, and the touch detection control unit 22 receives the coordinate detection signal P via the touch detection electrode 11. As a result, the touch detection control unit 22 locates the position touched by the active pen 4 in accordance with the position of the touch detection electrode 11 at which the coordinate detection signal P is detected. The touch detection control unit 22 then transmits information about the position touched by the active pen 4 as the touch detection report to the host control unit 3. In the periods T5, T6, T11, and T12, the active pen 4 transmits the tilt and pressure signal D, and the touch detection control unit 22 receives the tilt and pressure signal D via the touch detection electrodes 11. As such, the touch detection control unit 22 acquires information about the tilt of the active pen 4 and information about the strength (pressure) of stroke of the active pen 4. The touch detection control unit 22 then transmits the information about the tilt of the active pen 4 and the information about the strength (pressure) of stroke of the active pen 4 as the touch detection report to the host control unit 3. Also in the pen touch mode, the finger-touch detection operation is performed in the periods T2 and T3, and T8 and T9 in the same manner as in the periods T2 and T3, and T8 and T9 in the finger touch mode. This means that in the pen touch mode not only the active pen 4 but also a pointer such as a finger are targeted for touch detection. In the periods T1 to T13, the write operation is performed.

Operation in Normal Operational Condition

An operation of the display device 100 in the normal operational condition will be described with reference to FIG. 4. As illustrated in FIG. 4, the write operation and the touch detection operation are alternately performed in synchronization with the timing signal Ts. For example, when the timing signal Ts indicates High, the write operation is performed; when the timing signal Ts indicates Low, the touch detection operation is performed.

Specifically, at a time point t0, an image input period starts, and the write operation starts as illustrated in FIG. 4. At a time point t1, the touch detection operation starts. At a time point t2, a suspension period starts, and the write operation and the touch detection operation are alternately performed in synchronization with the timing signal Ts. At a time point t3, a new image input period starts, and afterwards, the write operation and the touch detection operation are alternately performed. Operation in variable-frame-rate operational condition and suspension operational condition An operation of the display device 100 in the variable-frame-rate operational condition and the suspension operational condition will be described with reference to FIG. 6. As illustrated in FIG. 6, because a suspension period is of the length L2 longer than the length L1, the frame rate in the variable-frame-rate operational condition and the suspension operational condition is lower than the frame rate in the normal operational condition.

As illustrated in FIG. 6, in an image input period, the write operation and the touch detection operation are alternately performed in synchronization with the timing signal Ts. In a period of the length L1 of the suspension period, the write operation and the touch detection operation are alternately performed in synchronization with the timing signal Ts. After the period of the length L1 of the suspension period, the touch detection operation is repeatedly performed at regular intervals. As such, although the frame rate for displaying is lowered, the frame rate regarding touch detection is maintained.

In the present embodiment, when a new image signal is supplied during the suspension period, and a new image input period starts, an ongoing or subsequent touch detection operation (touch detection operation in the period T7 in FIG. 6) is firstly finished; the new image signal stored in the storage unit 52 is then outputted to the drive circuit 12 in the display device 100; and the write operation of the touch panel 1 starts by using a data signal based on the new image signal. Specifically, when the new image input period starts, the timing control unit 21 detects, in accordance with the timing signal Ts, a time point (time point t14 in FIG. 6) at which the ongoing or subsequent touch detection operation finishes. The timing control unit 21 performs the write operation after the time point (time point t14 in FIG. 6) at which the touch detection operation finishes. With this configuration, also in the case of variable frame rate, instead of during the touch detection operation, at the time point t14, at which an ongoing or subsequent touch detection operation finishes, a new image signal stored in the storage unit 52 is outputted to the drive circuit 12 in the display device 100, and the write operation of the touch panel 1 stars by using a data signal based on the new image signal. As a result, the timing of the touch detection operation is aligned with the timing for the write operation.

Furthermore, in the present embodiment, when a new image input period starts, even if the ongoing or subsequent touch detection operation is not completed for all the periods including the period T13, the timing control unit 21 performs the write operation of the touch panel 1 after any (touch detection in the period T7 in FIG. 6) of the periods T1 to T13 ends. Particularly in the pen touch mode, when a new image input period starts, the timing control unit 21 performs the write operation of the touch panel 1 after completing any (acquisition operation of the coordinate detection signal P in the period T7 in FIG. 6) of the following operations: an ongoing or subsequent transmit operation of the beacon signal B, an ongoing or subsequent receive operation of the coordinate detection signal P, and an ongoing or subsequent acquisition operation of the tilt and pressure signal D. With this configuration, the timing of the write operation is earlier than if the write operation is performed after the touch detection operation is completed for all the periods T1 to T13 (it is possible to hinder an increase in delay time).

Specifically, in the example in FIG. 6, at a time point t10, an image input period starts, and the write operation starts. At a time point t11, the touch detection operation starts. Afterwards, until a time point t12 after a suspension period starts (for a period of the length L1), the write operation and the touch detection operation are alternately performed in synchronization with the timing signal Ts. Subsequently in the suspension period (period after the time point t12 to a time point t13), the write operation is not performed, but the touch detection operation is repeatedly performed at regular intervals. As such, for example, the touch detection operation is performed in the periods T1 to T13 and additionally in the periods T1 to T6 during the period of one frame.

If the write operation starts at the time point t13 in the middle of the touch detection operation in the period T7, the write operation is performed during the touch detection operation, and as a result, the signal for the write operation interferes with the signal for the touch detection operation in the touch panel (touch detection electrode), which prevents normal operation. For example, accurate touch detection is prevented, and proper displaying is not achieved. In this regard, the touch detection operation in the period T7 is completed without starting the write operation at the time point t13 in the present embodiment. At a time point t14 after the touch detection operation in the period T7 is completed, the write operation starts by using a data signal based on an image signal stored in the storage unit 52. Subsequently at a time point t15, the touch detection operation in the period T8 following the period T7 starts. Afterwards, the write operation and the touch detection operation are alternately performed. With this configuration, it is possible to align the timing of the touch detection operation with the timing of the write operation, while preventing interferences between the signal for the write operation and the signal for the touch detection operation.

Operation for Reducing Delay Time

Figure 7:
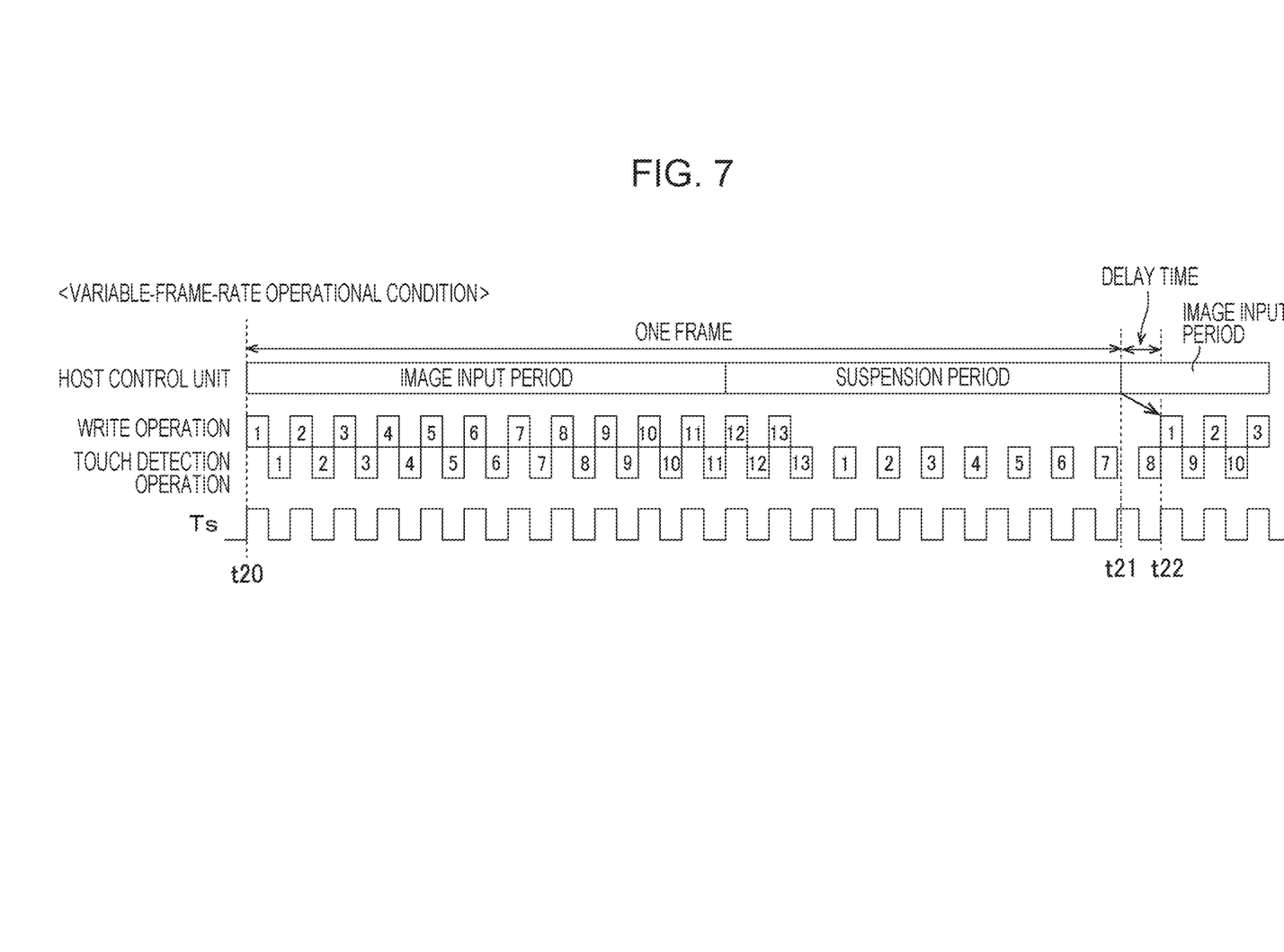
FIG. 7 is a timing diagram illustrating the case in which delay time is caused.
Figure 8:
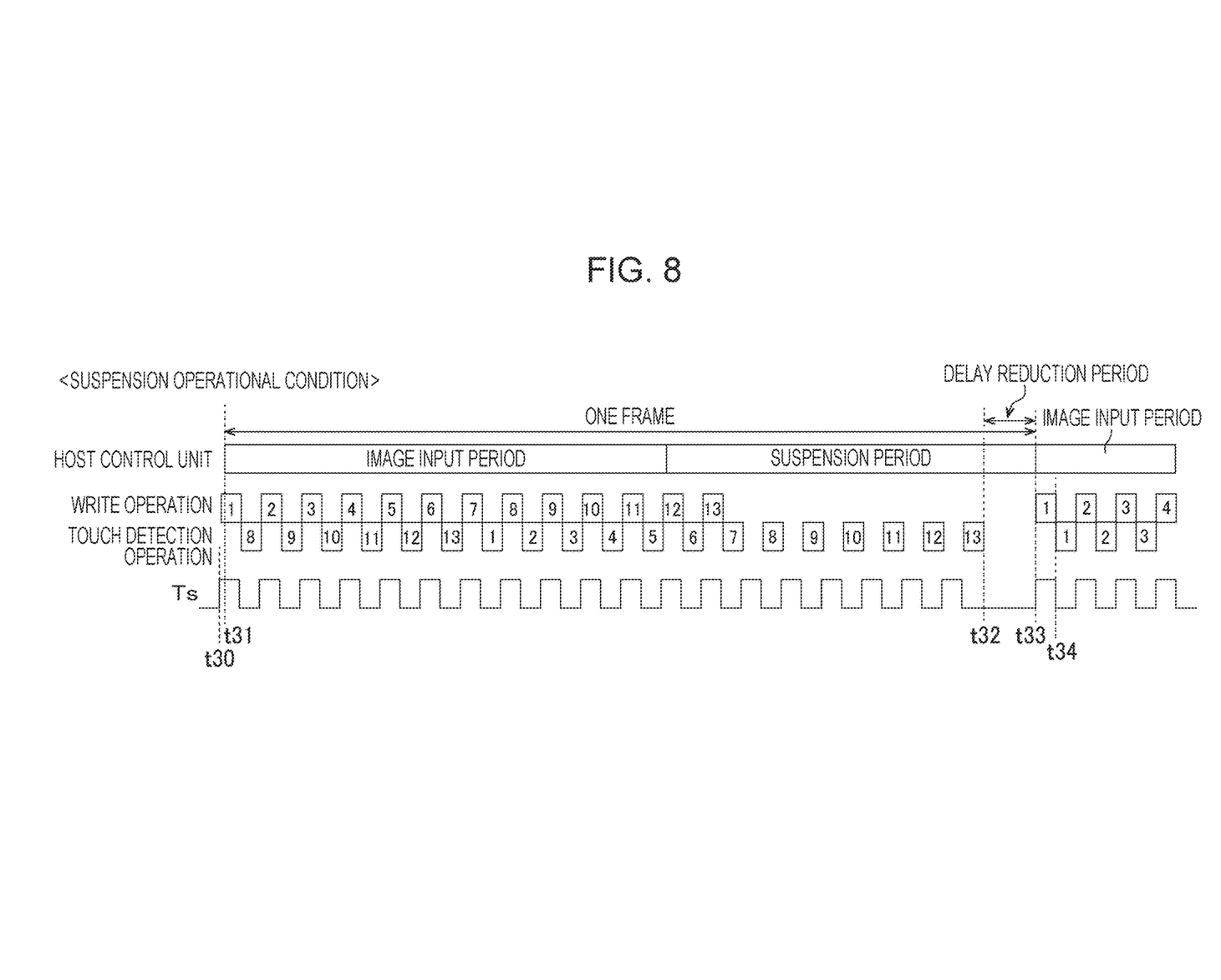
FIG. 8 is a timing diagram illustrating the case in which delay time is reduced.

Next, an operation for reducing delay time in the display device 100 will be described with reference to FIGS. 7 and 8. FIG. 7 illustrates the case in which delay time is caused in the variable-frame-rate operational condition. FIG. 8 illustrates the case in which delay time is reduced in the suspension operational condition. The "delay time" is a period from the time point at which an image input period starts until the time point at which the write operation starts for the first time in the image input period by using an image signal stored in the storage unit 52.

As illustrated in FIG. 7, in the present embodiment, a new image input period starts at a time point t21 of the suspension period; and at a time point t22 when an ongoing or subsequent touch detection operation (touch detection operation in the period T8 in FIG. 7) is completed, a new image signal stored in the storage unit 52 is outputted to the drive circuit 12 in the display device 100, and the write operation starts. In this case, the period from the time point t21 until the time point t22 is the delay time, so that the timing control unit 21 acquires information about the delay time. The example in FIG. 8 illustrates the case in which, while the delay time illustrated in FIG. 7 is caused, the variable-frame-rate operational condition is changed to the suspension operational condition. During the period in which the variable-frame-rate operational condition is changed to the suspension operational condition, control may be provided in the normal operational condition for a given period.

As illustrated in FIG. 8, when information about an operational condition (operational condition selected by the host control unit 3) acquired from the host control unit 3 indicates the "suspension operational condition", the timing control unit 21 suspends the touch detection operation in the suspension period. The timing control unit 21 synchronizes the timing of the timing signal Ts with a start time point (time point t33 in FIG. 8) of a new image input period after the touch detection operation is suspended. Accordingly, the timing control unit 21 performs the touch detection operation and the write operation in an alternating manner in accordance with the timing signal Ts synchronized with the start time point.

Specifically, as illustrated in FIG. 8, a time point t30 at which the timing signal Ts indicates High is not coincident with a time point t31 at which an image input period starts. After a suspension period starts, from a time point t32 at which the final period T13 of the touch detection operation ends to a time point t33 at which a new image signal is supplied (time point at which a new image input period starts), the timing control unit 21 stops (suspends) the touch detection operation. After the time point t33 at which the new image input period starts, the write operation and the touch detection operation restart. For example, the timing signal Ts is changed to High at the time point t33, and the write operation accordingly starts. At a time point t34 at which the timing signal Ts is subsequently changed to Low, the touch detection operation restarts. In this manner, the period from the time point t32 until the time point t33 functions as a period for reducing delay time (delay reduction period), and as a result, the delay time is reduced.

With this configuration, if a delay time is to be caused from the time point t21 at which an image input period starts until the time point t22 at which the write operation starts for the first time in the image input period as illustrated in FIG. 7, the delay time can be reduced as illustrated in FIG. 8. In the variable-frame-rate operational condition, because the length of suspension period may vary, delay time is not always reduced by suspending touch detection in the variable-frame-rate operational condition. By contrast, with the configuration described above, touch detection is suspended in the suspension operational condition with a particular length of suspension period, and thus, delay time can be more reliably reduced. Furthermore, because the touch detection operation restarts after delay time is reduced, the period without touch detection is shorter than if the touch detection operation is continuously suspended to reduce delay time.

Modifications

The embodiment described above is a mere example implementing the present disclosure. The present disclosure is thus not limited to the embodiment and can be implemented by modifying the embodiment as appropriate without departing from the spirit and scope of the present disclosure.

(1) The embodiment uses the example in which the display device is configured to perform both the touch detection operation for a pointer such as a finger and the touch detection operation for an active pen capable of communication, but the present disclosure is not limited to this example. The display device may be configured to perform either the touch detection operation for a pointer such as a finger or the touch detection operation for an active pen capable of communication.

(2) The embodiment uses the example in which the touch detection operation is performed thirteen times for one frame in the normal operational condition, but the present disclosure is not limited to this example. The touch detection operation may be performed for one frame a particular number of times less than thirteen times, or fourteen times or more. Further, the number of times of the finger-touch detection operation for one frame, the number of times of the beacon-signal transmit operation for one frame, the number of times of the coordinate-detection-signal receive operation for one frame, and the number of times of the tilt-and-pressure-signal receive operation for one frame are also not limited to the examples described above.

(3) The embodiment uses the example in which the touch detection operation is suspended to reduce delay time in the suspension period after touch detection is completed in periods including the period T13, but the present disclosure is not limited to this example. The touch detection operation may be suspended to reduce delay time in the suspension period before the touch detection operation in the period T13 is performed.

The following describes the display device with a touch panel described above and a method for controlling the display device with a touch panel.

A display device with a touch panel according to a first configuration is configured to operate by using a variable frame rate. The variable frame rate is configured by changing, of an image input period and a suspension period that constitute one frame, the length of the suspension period. In the image input period, an image signal is supplied to the display device with a touch panel, and in the suspension period, no image signal is supplied to the display device with a touch panel. The display device with a touch panel includes a touch panel including a pixel electrode, a control unit configured to control displaying of the touch panel and touch detection of the touch panel, and a storage unit configured to store the image signal. The control unit includes a touch detection control unit configured to perform a touch detection operation of the touch panel in the image input period and the suspension period, a display control unit configured to perform a write operation of outputting the image signal stored in the storage unit to the touch panel and loading the pixel electrode with a data signal based on the image signal in the image input period, and a timing control unit configured to provide control to perform the touch detection operation and the write operation in an alternating manner in the image input period and to perform at least the touch detection operation at regular intervals in the suspension period. The timing control unit is further configured to, when a new period of the image input period starts, provide control to perform the write operation after an ongoing or subsequent sub-operation of the touch detection operation finishes (first configuration).

Here, when the frame rate lowers, one idea is to suspend both the write operation and the touch detection operation in the suspension period. In this case, however, the number of times of the touch detection operation per time decreases, and consequently, the responsiveness of touch detection is degraded. Another idea is to perform the touch detection operation in the suspension period when the frame rate lowers. However, if the time point at which a new image signal is supplied (start time point of an image input period) is in the middle of the touch detection operation, the touch detection operation and the write operation are concurrently performed in the touch panel. In this case, the signal for the touch detection operation interferes with the signal for the write operation, and the touch detection operation and the write operation are not properly performed. By contrast, with the first configuration, also in the case of variable frame rate, instead of during the touch detection operation, after an ongoing or subsequent touch detection operation finishes, a new image signal stored in the storage unit is outputted to the touch panel, and the write operation of the touch panel is performed. As a result, the timing for the touch detection operation is aligned with the timing for the write operation. Consequently, touch detection can be performed for a pointer such as a finger or pen when a variable frame rate is used to provide control.

In the first configuration, the timing control unit may be configured to generate a timing signal to align a timing of the touch detection operation with a timing of the write operation; the touch detection control unit may be configured to perform the touch detection operation in synchronization with the timing signal; and the timing control unit may be configured to, when a new period of the image input period starts, detect in accordance with the timing signal a time point at which an ongoing or subsequent sub-operation of the touch detection operation finishes and provide control to perform the write operation after the time point (second configuration).

With the second configuration, it is possible to easily detect, in accordance with the timing signal, a time point at which an ongoing or subsequent touch detection operation finishes.

In the first or second configuration, an operational-condition determination unit configured to select one operational condition from a normal operational condition in which one frame includes the suspension period of a first predetermined length, a suspension operational condition in which one frame includes the suspension period of a second predetermined length longer than the first predetermined length, and a variable-frame-rate operational condition in which one frame includes the suspension period of variable length may be included; the timing control unit may be configured to, if a delay time is to be caused from a time point at which a new period of the image input period starts until a time point at which a first sub-operation of the write operation in the new period of the image input period starts, when the operational-condition determination unit selects the suspension operational condition, provide control to suspend the touch detection operation in the suspension period, and after the touch detection operation is suspended, provide control to restart the touch detection operation later than when the new period of the image input period starts (third configuration).

With the third configuration, if a delay time is to be caused from the time point at which an image input period starts until the time point at which the write operation starts for the first time in the image input period, the delay time can be reduced. In the variable-frame-rate operational condition, because the length of suspension period may vary, delay time is not always reduced by suspending the touch detection operation in the variable-frame-rate operational condition. By contrast, with the third configuration, the touch detection operation is suspended in the suspension operational condition with a particular length of suspension period, and thus, delay time can be more reliably reduced. Furthermore, because the touch detection operation restarts after delay time is reduced, the period without the touch detection operation is shorter than if the touch detection operation is continuously suspended to reduce delay time.

In any one of the first to third configurations, the touch detection control unit may be configured to, after performing a predetermined number of sub-operations of the touch detection operation, locate a touch position; and the timing control unit may be configured to, when a new period of the image input period starts, provide control to perform the write operation after an ongoing or subsequent sub-operation of the predetermined number of sub-operations of the touch detection operation finishes (fourth configuration).

With the fourth configuration, the timing of the write operation is earlier than if the write operation of the touch panel is performed after the touch detection operation is completed a predetermined number of times (it is possible to hinder an increase in delay time).

In any one of the first to fourth configurations, a communication unit configured to communicate with an active pen may be further included; the touch detection control unit may be configured to perform a transmit operation of transmitting a beacon signal to the active pen and a receive operation of receiving a coordinate detection signal from the active pen; and the timing control unit may be configured to, when a new period of the image input period starts, provide control to perform the write operation after an ongoing or subsequent sub-operation of the transmit operation of the beacon signal or an ongoing or subsequent sub-operation of the receive operation of the coordinate detection signal finishes (fifth configuration).

With the fifth configuration, the timing of the write operation is earlier than if the write operation of the touch panel is performed after transmission of the beacon signal and acquisition of the coordinate detection signal are completed (it is possible to hinder an increase in delay time).

A method according to a sixth configuration is for controlling a display device with a touch panel including a pixel electrode and being configured to operate by using a variable frame rate. The variable frame rate is configured by changing, of an image input period and a suspension period that constitute one frame, the length of the suspension period. In the image input period, an image signal is supplied to the display device with a touch panel, and in the suspension period, no image signal is supplied to the display device with a touch panel. The method includes storing the image signal in a storage unit, providing control to perform in an alternating manner a touch detection operation of the touch panel and a write operation of outputting the image signal stored in the storage unit to the touch panel and loading the pixel electrode with a data signal based on the image signal in the image input period, providing control to perform at least the touch detection operation at regular intervals in the suspension period, and when a new period of the image input period starts, providing control to perform the write operation after an ongoing or subsequent sub-operation of the touch detection operation finishes (sixth configuration).

With the sixth configuration, similarly to the first configuration, touch detection can be performed for a pointer such as a finger or pen when a variable frame rate is used to provide control.

The present disclosure contains subject matter related to that disclosed in Japanese Priority Patent Application JP 2021-038277 filed in the Japan Patent Office on Mar. 10, 2021, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display device with a touch panel, the display device being configured to operate by using a variable frame rate, in which
   the variable frame rate is configured by changing, of an image input period and a suspension period that constitute one frame, a length of the suspension period, and
   in the image input period, an image signal is supplied to the display device with the touch panel, and in the suspension period, no image signal is supplied to the display device with the touch panel,
   the display device with the touch panel comprising:
      an in-cell touch panel including a pixel electrode;
      a control unit configured to control displaying of the in-cell touch panel and touch detection of the in-cell touch panel; and
      a storage unit configured to store the image signal, wherein
   the control unit includes
      a touch detection control unit configured to perform a touch detection operation of the in-cell touch panel in the image input period and the suspension period,
      a display control unit configured to perform a write operation of outputting the image signal stored in the storage unit to the in-cell touch panel and loading the pixel electrode with a data signal based on the image signal in the image input period, and
      a timing control unit configured to provide control to perform the touch detection operation and the write operation in an alternating manner in the image input period and to perform at least the touch detection operation at regular intervals in the suspension period, the timing control unit being further configured to provide control to perform the write operation after a sub-operation of the touch detection operation executed over the suspension period to a subsequent image input period following finishing of the suspension period, or a sub-operation of the touch detection operation first executed after an initiation of the subsequent image input period following finishing of the suspension period.

2. The display device with the touch panel according to claim 1, wherein
   the timing control unit is configured to generate a timing signal to align a timing of the touch detection operation with a timing of the write operation,
   the touch detection control unit is configured to perform the touch detection operation in synchronization with the timing signal, and
   the timing control unit is configured to detect in accordance with the timing signal a time point at which a sub-operation of the touch detection operation executed over the suspension period to a subsequent image input period following the suspension period finishes or a sub-operation of the touch detection operation first executed after an initiation of the subsequent image input period finishes, an ongoing or subsequent sub-operation of the touch detection operation finishes and provide control to perform the write operation after the time point.

3. The display device with the touch panel according to claim 1, further comprising:
   an operational-condition determination unit configured to select one operational condition from a normal operational condition in which one frame includes the suspension period of a first predetermined length, a suspension operational condition in which one frame includes the suspension period of a second predetermined length longer than the first predetermined length, and a variable-frame-rate operational condition in which one frame includes the suspension period of variable length, wherein
   the timing control unit is configured to
      if a delay time is to be caused from a time point at which a new period of the image input period starts until a time point at which a first sub-operation of the write operation in the new period of the image input period starts, when the operational-condition determination unit selects the suspension operational condition, provide control to suspend the touch detection operation in the suspension period, and
      after the touch detection operation is suspended, provide control to restart the touch detection operation later than when the new period of the image input period starts.

4. The display device with the touch panel according to claim 1, wherein
   the touch detection control unit is configured to, after performing a predetermined number of sub-operations of the touch detection operation, locate a touch position, and
   the timing control unit is configured to provide control to perform the write operation after a sub-operation of the sub-operations executed over the suspension period to a subsequent image input period following the suspension period finishes, or a sub-operation of the sub-operations first executed after an initiation of the subsequent image input period finishes.

5. The display device with the touch panel according to claim 1, further comprising:
   a communication unit configured to communicate with an active pen, wherein
   the touch detection control unit is configured to perform a transmit operation of transmitting a beacon signal to the active pen and a receive operation of receiving a coordinate detection signal from the active pen, and
   the timing control unit is configured to provide control to perform the write operation after a sub-operation of the transmit operation executed over the suspension period to a subsequent image input period following finishing of the suspension period, a sub-operation of the touch detection operation first executed after an initiation of the subsequent image input period finishes, a sub-operation of the receive operation executed over the suspension period to a subsequent image input period following finishing of the suspension period, or a sub-operation of the receive operation first executed after an initiation of the subsequent image input period finishes.

6. A method for controlling a display device with an in-cell touch panel, the display device including a pixel electrode and being configured to operate by using a variable frame rate, in which the variable frame rate is configured by changing, of an image input period and a suspension period that constitute one frame, a length of the suspension period, and in the image input period, an image signal is supplied to the display device with the in-cell touch panel, and in the suspension period, no image signal is supplied to the display device with the in-cell touch panel, the method comprising:
storing the image signal in a storage unit;
providing control to perform in an alternating manner a touch detection operation of the in-cell touch panel and a write operation of outputting the image signal stored in the storage unit to the in-cell touch panel and loading the pixel electrode with a data signal based on the image signal in the image input period;
providing control to perform at least the touch detection operation at regular intervals in the suspension period; and
providing control to perform the write operation after a sub-operation of the touch detection operation executed over the suspension period to a subsequent image input period following finishing of the suspension period, or a sub-operation of the touch detection operation first executed after an initiation of the subsequent image input period finishes.

* * * * *